June 16, 1953  A. E. WALTMAN  2,641,797
SHRIMP ASSIMILATING MACHINE
Filed March 22, 1949  6 Sheets-Sheet 1

INVENTOR.
Adolf E. Waltman

June 16, 1953  A. E. WALTMAN  2,641,797
SHRIMP ASSIMILATING MACHINE
Filed March 22, 1949  6 Sheets-Sheet 4

INVENTOR.
Adolf E. Waltman

Patented June 16, 1953

2,641,797

UNITED STATES PATENT OFFICE 2,641,797

SHRIMP ASSIMILATING MACHINE

Adolf E. Waltman, Pass Christian, Miss., assignor of one-third to Edgar P. Guice and one-third to Eldon E. Hickey, both of Ocean Springs, Miss.

Application March 22, 1949, Serial No. 82,761

7 Claims. (Cl. 17—32)

My invention relates to the general art of preparing seafoods and more particularly to the art of assimilating a large shrimp product or other shrimp food from fibred and shredded small and broken shrimp.

The object of this invention is to provide a mechanical means to fibre and shred small, nonprofitable, but highly flavorable and tender shrimp and broken shrimp and to employ such shredded shrimp meat in heated molds, and thus form the assimilated product.

Another object of this invention is to provide mechanical means for forcing fibre and shredded shrimp meat into heated molds.

A still further object of this invention is to provide a rotating die table in which the molds are surrounded by a heating jacket and to provide means to supply steam, hot water or other means of heat to the jacket and to provide for the escape of steam condensate from the jacket or to provide for circulation of hot water or other heat carrying liquid through the mold jacket.

Another object of the invention is to provide a cooling jacket surrounding a hopper into which the meat from broken and small shrimp may be introduced and maintain such shrimp meat in its chilled state until shredded.

A still further object of this invention is to provide automatic operation for cleaning the molds.

A still further object of this invention is to provide automatically controlled means for lubricating the molds prior to their injection with fibred and shredded shrimp meat aggregate.

Another object of this invention is to provide synchronous operation of all the hereinbefore recited operations.

The assimilated shrimp is made of a size comparable to the full grown large variety, the socalled jumbo shrimp, by shredding the tender and highly flavorable meat of broken and young shrimp in such a manner that the fibres, more or less separated by shredding of the meat, will become intangled and surrounded by the natural protoplasmic substances and jellying matters contained in the shrimp and extracted therefrom in the shredding process. The fibres thus segregated act as a reinforcement and upon solidifying of the protoplasmic and jellying substances by application of heat a large marketable shrimp is produced which possesses all the flavor and tenderness of the young and small variety and will retain its molded shape.

This assimilated shrimp may be frozen or processed and canned in the same manner as the ordinary shrimp. The heating operation necessary to solidify the shredded meat will keep it for a considerable time under ordinary refrigeration. In its frozen state it is quite superior to the fresh frozen product. The individually frozen and glazed shrimp have an outstanding sales appeal and thus constitute a valuable and new contribution to the sea food market.

While the product heretofore described refers to assimilated shrimp, the process may be applied to produce a variety of other sea food products of different shapes in a similar manner by changing the shape of the mold. Such shrimp products not heretofore produced are for instance shrimp sausage, patties, cakes, loafs and the like.

Since some of these products due to their shape may not be readily removed from the molds by the method used for ejection of the assimilated shrimp, it is understood that a variation in construction of the molds, ejecting, cleaning, and lubricating device may be made to suit the different products without departing from the invention.

Still other objects and advantages will become apparent from the following description of the present invention illustrated in the accompanying drawings in which.

Figure 1:
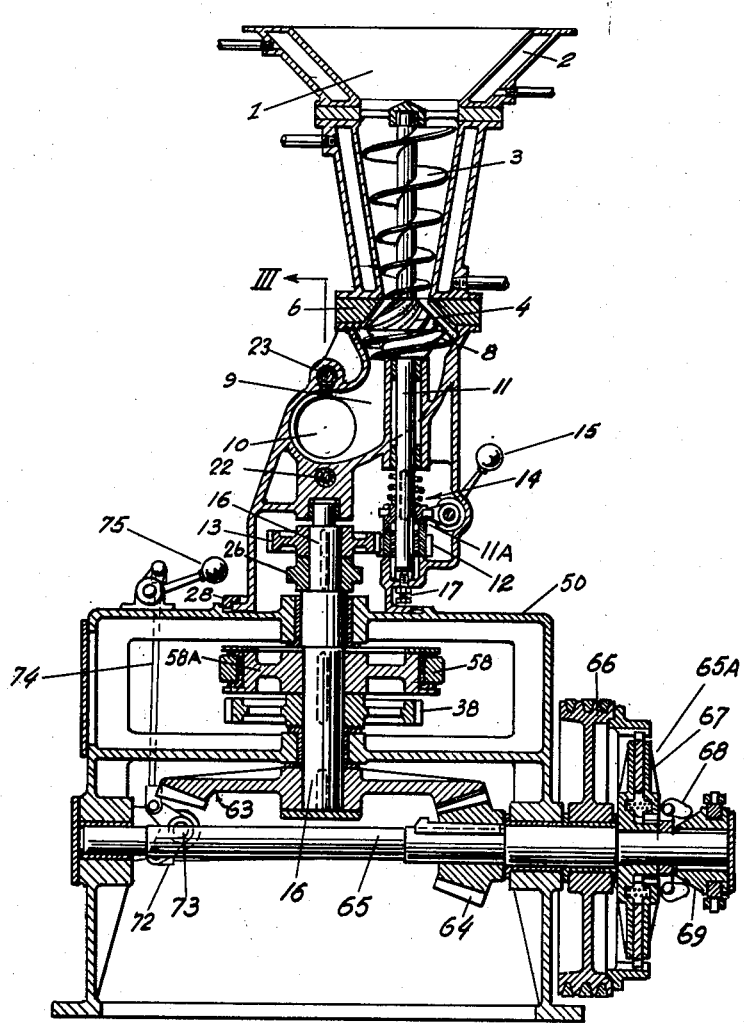
Figure 1 is a sectional view of the feeding and shredding mechanism taken along lines I—I of Figure 3.
Figure 2:
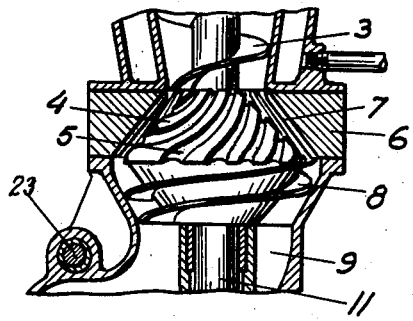
Figure 2 is an enlarged sectional view of the shredder unit.

In the drawings, the peeled and deveined shrimp are conveyed from the cleaning tables into hopper 1 which is surrounded by a jacket 2 containing circulating coolant in order to maintain the shrimp at their cold stage. The shrimp are conveyed by screw conveyor 3 onto rotating shredder 4 which has a conical shaped body provided with a number of spiral grooves 5 on its upper surface. The housing for the shredder 4 is formed by the member 6 which housing contains straight radial ridges 7 which housing has slightly larger taper to permit easy entry of the shrimp into the shredder. The action of this unit is such that it will tear the shrimp apart, rather than grinding the meat and, thereby, to a large extent preserve the fibers of the meat, and at the same time squeeze out the protoplasmic and the jellying substance contained in the meat to form the binding matter for the assimilated product as will hereinafter become apparent.

Figure 3:
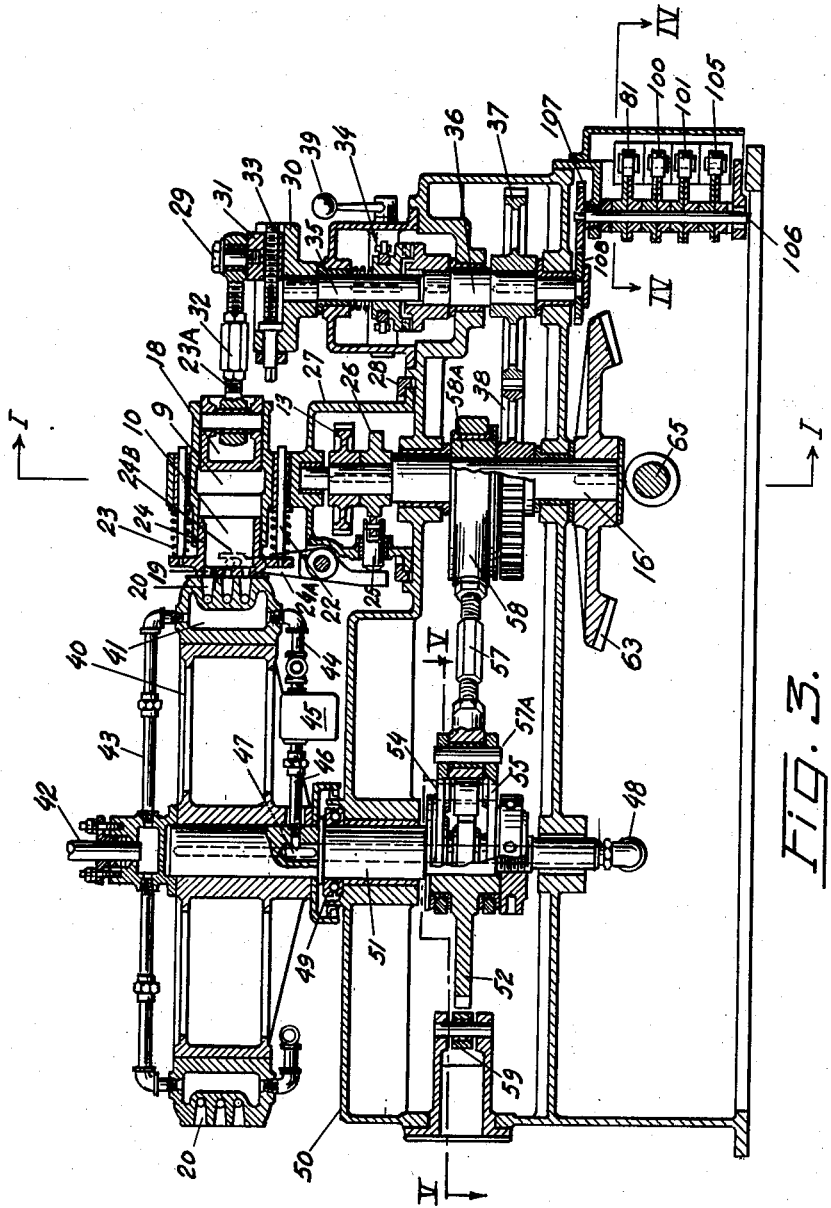
Figure 3 is a section taken along lines III—III of Figure 1 showing the feeding cylinder, plunger, dies, rotating die table and operating mechanism.

From the shredder 4 the mass is conveyed by screw conveyor 8 through passage 9 into the chamber 10 where it is ready to be forced into the molds 20 (Fig. 3).

Returning to the screw conveyors 3 and 8 and shredder 4 in Fig. 1, it will be seen that these three units are rotating on a single shaft 11 powered through a spring biased clutch, generally indicated at 14 with an operating handle 15, meshing shaft 11 with gear extension 11A of gear 12, which gear in turn meshes with gear 13 keyed to the shaft 16.

Clutch 14 is to provide means to stop the feeding action. It will be noted that the clearance between the stationary ridges 7 and the rotating grooves 5 may be adjusted by means of screw device 17.

As seen from Fig. 3 the shredded shrimp in chamber 10 are forced by the action of piston 18 out through openings 19 into the molds 20 until such molds are completely filled. Egress of the shrimp from the narrow ends of the molds is prevented by flanges 21 (see Fig. 4). The chamber 10 is in effect floating. That is, its housing 24 is supported by spring biased plungers 22 and 23 acting to force the housing against the molds 20. This permits reciprocating motion of the housing 24 so that whenever the piston is withdrawn the housing is simultaneously withdrawn from the face of the die 20. This action is accomplished through rocker arm 24A being acted upon at one end by the cam 26 pressing against plunger 25 to retract the housing 24 through the pin and fork connection 24B. This action is desirable in order to prevent the suction created by the retraction of the piston 18 from withdrawing any product from the mold 20. Actuating cam 26 is keyed to shaft 16.

The housing 24 and its support 27 is secured in place by a circular ring 28 in such a manner that upon loosening of ring 28 and disconnection of piston 18 by screw 29 the entire cylinder, hopper, shredder and conveyor apparatus may be revolved 90° and disassembled to facilitate cleaning.

A piston 18 is connected to drive wheel 30 through adjustable piston rod 23A and pin 29 on eccentrically mounted block 31 of drive wheel 30. It will be noted that the length of the piston stroke may be varied by adjustment of the connector 32 or the position of block 31 by means of the screw 33. Drive wheel 30 is driven through a spring biased clutch 34 on shafts 35 and 36 to gear 37 which in turn meshes with gear 38 on shaft 16. Lever 49 generally indicates the clutch operating lever.

Figure 5:
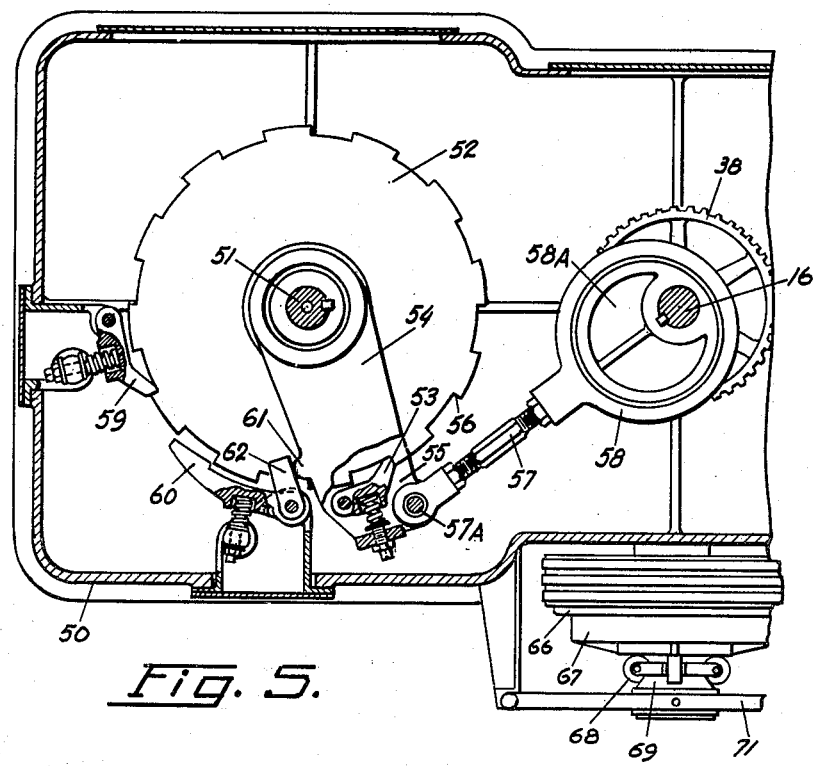
Figure 5 is a plan view of the indexing mechanism for the die table taken along line V—V of Figure 3 with some portions of the mechanism being broken away to more clearly illustrate the invention.
Figure 9:
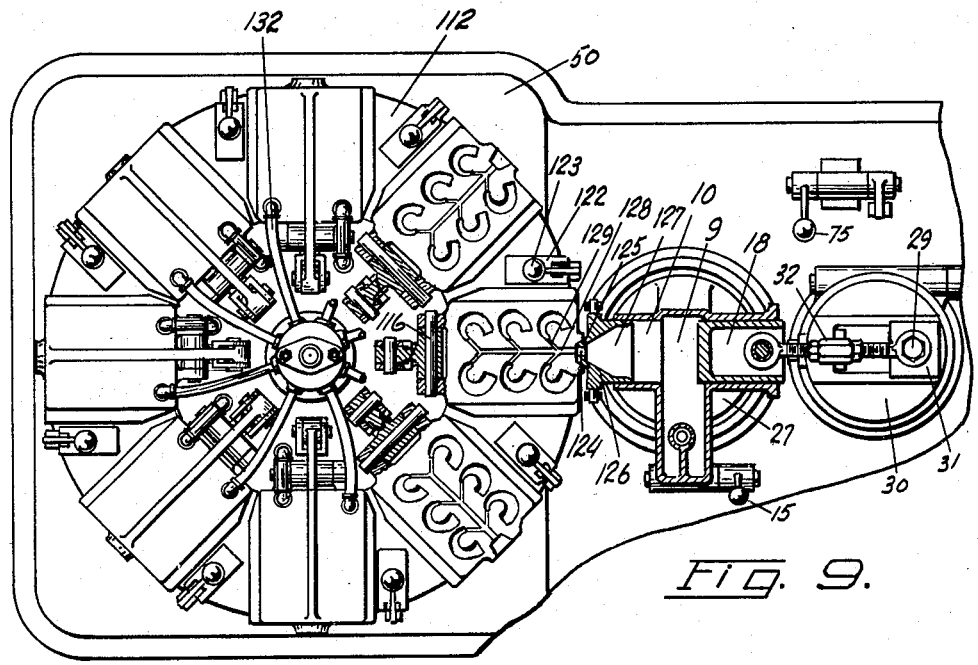
Figure 9 is a plan view, partially in section, showing the machine equipped with a different type of mold requiring manual removal of the shrimp and manual cleaning and lubricating of the mold.

The die table 40 contains a plurality of the assimilated shrimp molds 20 as may be noted in Figs. 3 and 9. This die table is intermittently rotated in order to present a fresh set of molds on each actuation to openings 19 of the chamber 10. The molds 20 are surrounded by heating chambers 41 in which chambers steam is admitted through connections 42 and 43. The steam is circulated through each set of molds and leaves the heating chamber via connections 44, steam trap 45, pipe 46, drilled hole 47 in shaft 51 and swivel joint connector 48. The rotating die table 40 is ball-bearingly mounted at 49 on frame 50 and rotated on shaft 51 by indexing plate 52. Index plate 52 (Fig. 5) is intermittently rotated whenever the spring biased pawl 53 of arms 54 and 55 engage the forward portion of a notch 56. Arms 54 and 55 are loosely fitted on the hub of indexing plate 52 at one end and pivotally connected at 57A to rod 57. This last named rod 57 is adjustably connected to ring 58 which is rotated by eccentrically inverted wheel 58A of shaft 16. A spring biased pawl 59 prevents back lash in the indexing table and a spring biased lock pawl 60 prevents motion of the indexing table until on the return stroke of arm 54 it is cammed out of position by the action of a projection 61 on the arm against portion 62 of the pawl.

Figure 4:
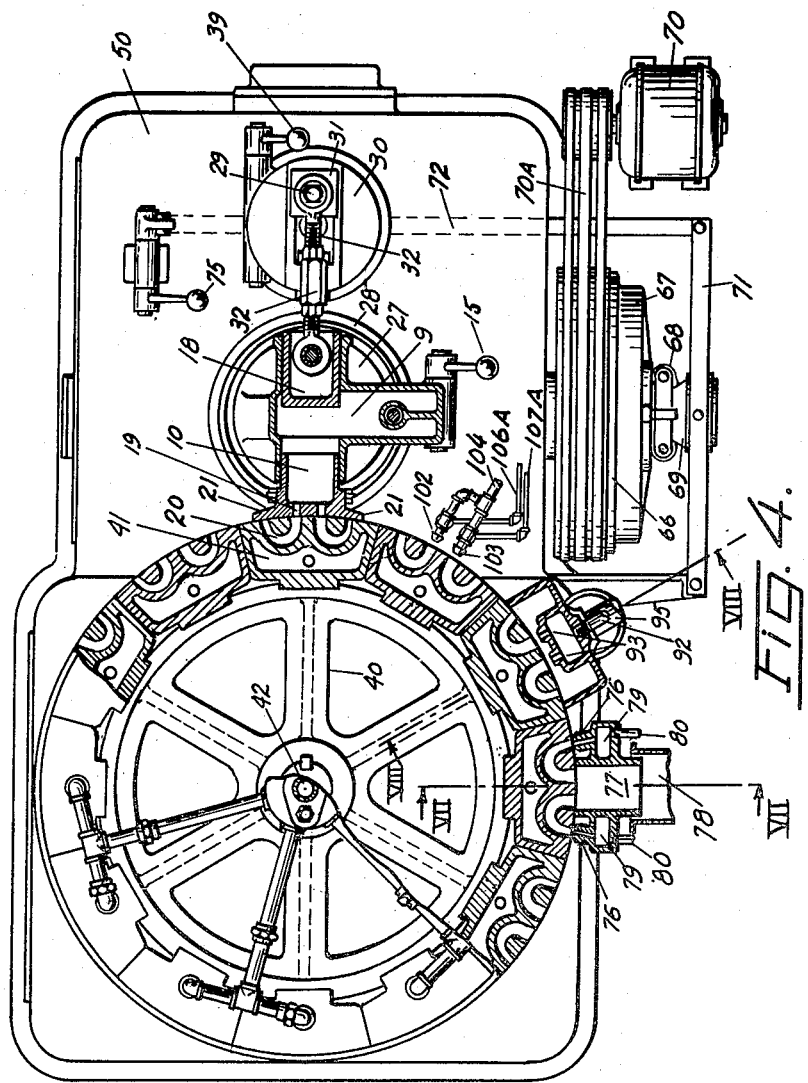
Figure 4 is a plan view, partially in section, showing the feed cylinder, die table and dies, shrimp ejecting, die cleaning and lubricating mechanism.

Shaft 16 through which power and synchronism for the die table the shredder, and molding operations is transmitted, is keyed to gear 63 (Fig. 1) which in turn meshes with pinion 64 rotated by shaft 65. Shaft 65 is rotated through a clutch generally indicated at 65A which comprises driving member 66, driven member 67, cams 68 and cam surface 69. As seen in Fig. 4, the driving member 66 is actuated by motor 70 through belt 70A. The operation of clutch 65a is accomplished through lever 71 which is pivotally connected to member 72 which in turn is pivoted at 73 (Fig. 1) to member 74 (Fig. 1) and clutch lever 75.

Figure 6:
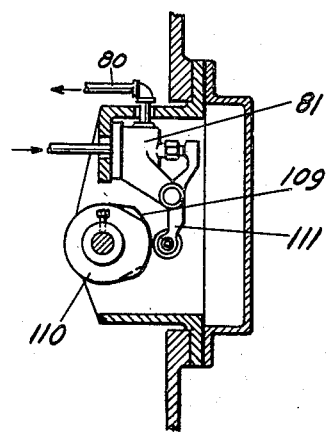
Figure 6 is a sectional plan view taken along lines VI—VI of Figure 3 showing cam actuated valves for operating the shrimp ejecting, cleaning and lubrication apparatus.
Figure 7:
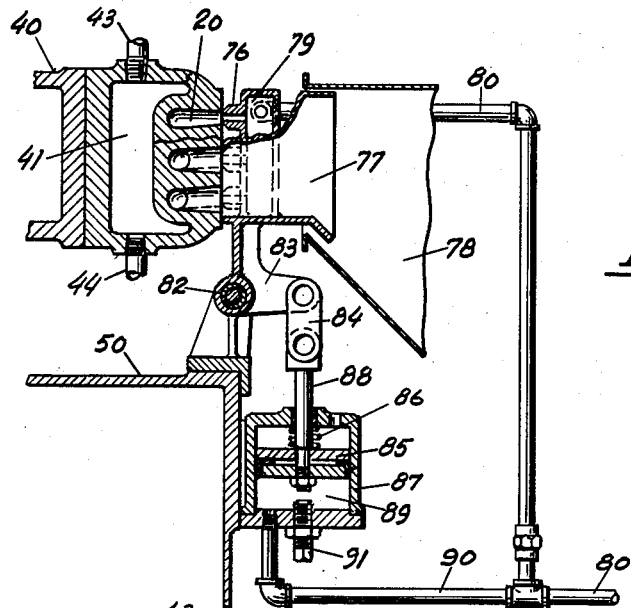
Figure 7 is a sectional elevational view of the mechanism for ejecting the finished product from the dies taken on line VII—VII of Figure 4 with some portions of the mechanism being broken away to more clearly illustrate the invention.

As best seen in Fig. 7 the ejection of the shrimp from the molds 20 is accomplished by forcing compressed air through nozzles 76 into the small end of the molds. The shrimp which are loose in the mold due to shrinkage are then in view of its curved and tapered shape easily forced out through the large opening of the molds through the chute 77 and into the chamber 78. Application of the compressed air is accomplished by attaching chamber 79 to a line 80 which is connected to three-way valve 81 (Figs. 3 and 6). The air ejection apparatus is pivotally mounted at 82 (Fig. 7) so that it may be pivoted away from the rotating die table 40. Normally the nozzles are biased away from the die by the action of spring 86 against the piston 85 and housing 87 attached to the frame 50. Piston 85 is connected by a rod 88 to link 84 which in turn is pivoted to the lever 83. This lever is pivoted at 82 and supports the container for the nozzles 76. When compressed air from the three-way valve 81 is forced through pipes 80 and 90, and enters the compartment 89 it overcomes the spring 86 to pivot the nozzles into working position. Screw 91 provides an adjustable stop for the piston 85.

Figure 8:
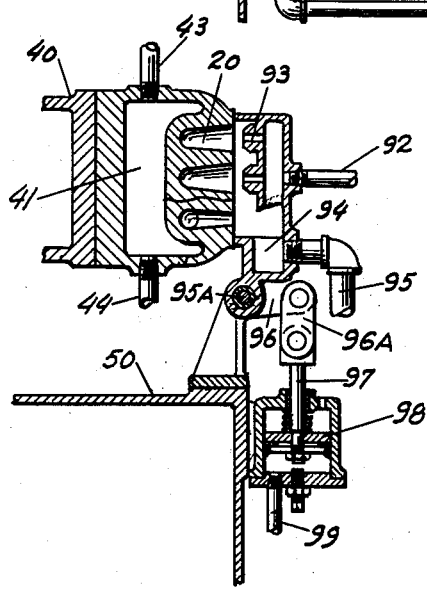
Figure 8 is a sectional elevational view of the mechanism for cleaning the dies taken along line VIII—VIII of Figure 4 with some portions of the mechanism being broken away to more clearly illustrate the invention.

In a similar manner a clean out station will next be brought into play (Fig. 8). On the subsequent indexing of the die table 40 the mold from which the assimilated shrimp has been ejected will now be presented to the cleanout station shown in Fig. 8. In this case high pressure water from pipe 92 will be forced through nozzles 93 into molds 20 and out onto the drip pan 94 and then drained by pipe 95. In a manner similar to that described for the ejecting station, nozzles are presented to the mold openings for operation and then pivoted away from the die table. In this case it is accomplished through pivot 95A and lever 96, link 96A, piston rod 97 and spring biased piston 98. The control for water injection at pipe 92 and air injection at pipe 99 is controlled by three-way valves 100 and 101 (Fig. 3) respectively as will hereinafter be described.

As seen in Fig. 4, at a following station lubricating vegetable oil is sprayed into the mold openings through nozzles 102 and 103 by compressed air entering pipe 104 from the three-way valve 105 (Fig. 3). The vegetable oil is bled from pipes 106A and 107A into the compressed air pipes. As will be noted in Fig. 3, all three-way valves are operated from a shaft 106 which is keyed to gear 107 and which in turn meshes with gear 108 of shaft 36.

Referring specifically to Fig. 6, it will be noted that the three-way valve 81, which is similar to valves 100, 101 and 105 is actuated by adjustable cams 109 and 110 through rocker arm 111. By means of adjusting cams 109 and 110 the valve 81 may be properly timed and synchronized with the remainder of the machine. Valves 100, 101 and 105 are similarly actuated.

Figure 10:
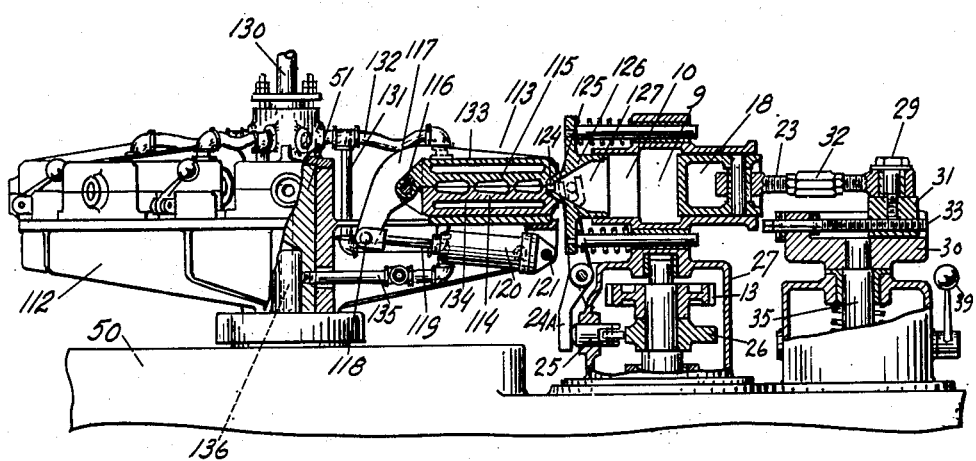
Figure 10 is a side view with one mold and feeding mechanism shown in section.

While many shrimp products may be produced in this machine by using a different shaped mold, some of these products would due to their shape, be difficult to eject from the type of mold heretofore described and would therefore require a split mold. Such molds are shown in Figs. 9 and 10, mounted on die table 112 consisting of a circular ribbed disc keyed to shaft 51. The mold generally shown at 113 in Fig. 10 is split horizontally into two halves, the lower half 114 being attached to die table 112. The upper half 115 is hinged to the lower part on pin 116. Lever 117, being part of the upper half of the mold, is pivotally connected at 118 to piston rod 119 of cylinder 120. The opposite end of cylinder 120 is pivotally secured to the die table 112 by pin 121. By admitting fluid to cylinder 120 by means of four-way valves 122 with operating handle 123 the motion of the piston will act upon arm 117 and raise the upper half of the mold 115, allowing the assimilated product to be removed and the dies to be brushed clean and lubricated.

By moving operating handle 123 of valve 122 in opposite direction the flow of fluid to cylinder 120 will be reversed and the action of the piston on lever 117 through piston rod 119 will close the mold maintaining sufficient pressure while the shredded shrimp meat is injected into the mold through opening 124 in nozzle 125 of housing 126 from chamber 127 by piston 18 in same manner as has already been described.

As may be noticed in Fig. 9 which shows the upper part of the mold removed, a plurality of assimilated shrimp may be produced by each injection, each shrimp cavity in the mold being connected to a central channel 128 by a small passage 129.

For heating of the mold steam or hot water is admitted through pipes 130 and 131 and flexible connection 132 to heating chambers 133 and 134 of the mold. Return for the fluid is provided by means of connection 135 into drilled hole 136 in shaft 51 from where it is discharged through a swivel joint connection 48 in Fig. 3 attached to the end of the shaft.

It will be seen that I have invented an automatic mechanical means for shredding, molding and assimilating shrimp. All operations of the machine are synchronized and are designed in such a fashion that the machine will continuously produce the assimilated shrimp.

While the preferred form of the invention has been shown and described it will be understood that variation in detail and form may be made without departure from the invention.

I claim:

1. In a molding apparatus for manufacturing assimilated shrimp from shredded shrimp meat, comprising a circular die table having a mold of semi-circular cross-section therein provided with two terminal openings extending through the periphery thereof, an injection element for supplying meat to said mold having a concave surface complementary to the periphery of said mold and in contact therewith, said injection element having an opening therein registering with one of the openings of said mold, the concave surface of said injection element extending over the second opening of said mold.

2. The apparatus of claim 1, in which said die table is rotatable and in which there are compressed air means spaced from said injection element and adjacent the periphery of the table and alineable with one of the openings in the mold for ejecting the assimilated shrimp product from the mold, means spaced from said ejecting means and adjacent the table and alineable with one of said openings for cleaning the mold, and operating means connected to said die table, said injection element, said compressed air means for ejecting shrimp, and said means for cleaning the molds for simultaneously controlling and synchronizing the molding apparatus.

3. The apparatus of claim 1, in which said die table is rotatable and in which there are compressed air means spaced from said injection element and adjacent the periphery of the table and alineable with one of the openings in the mold for ejecting the assimilated shrimp product from the mold, means spaced from said ejecting means and adjacent the table and alignable with one of said openings for cleaning the mold, means spaced from said means for cleaning the mold and adjacent the table and alignable with one of said mold openings for lubricating the mold in preparation for a following injection of shredded shrimp meat, and operating means connected to said die table, said injection element, said compressed air means for ejecting shrimp, said means for washing the mold, and said means for lubricating the mold for simultaneously controlling and synchronizing the molding apparatus.

4. In a molding apparatus for manufacturing assimilated shrimp from shredded shrimp meat, an intermittently rotatable die table having a plurality of spaced molds therein, said molds being similar in shape to a shrimp and each having an opening for receiving material to be molded, an injection means comprising a housing slidably mounted with respect to said molds, said housing having a chamber open at one end for the reception of material to be introduced into said molds, and a second opening at its opposite end for egress of said material, said second opening being alignable with the opening of each of said molds upon sliding movement of said housing toward each of said molds as each of said molds is positioned opposite said second opening, said housing being engageable with each of said molds as their openings are respectively alignable with said second opening, plungers connected to said housing and slidably mounted with respect to said molds and slidable with said housing, and spring members connected to said housing and retained in a position such as to urge said housing toward said molds, and a piston movable toward said chamber adjacent the open end thereof to eject material outwardly through said second opening into a mold when said housing is in contact with a mold, said piston being movable outwardly of said chamber after injection of material into a mold, and means for sliding said housing away from said molds as said piston is moved outwardly of said chamber.

5. In a molding apparatus for manufacturing assimilated shrimp from shredded shrimp meat, an intermittently rotatable die table having a plurality of spaced molds therein, said molds being similar in shape to a shrimp and each having an opening for receiving material to be molded, an injection means comprising a housing slidably mounted with respect to said molds, said housing having a chamber open at one end for the reception of material to be introduced into said molds and a second opening at its opposite end for egress of said material, said second opening being alignable with the opening of each of said molds upon sliding movement of said housing toward each of said molds as each of said molds is positioned opposite said second opening, said housing being engageable with each of said molds as their openings are respectively alignable with said second opening, plungers connected to said housing and slidably mounted with respect to said molds and slidable with said housing, and spring members connected to said housing and retained in a position such as to urge said housing toward said molds, and a piston movable toward said chamber adjacent the open end thereof to inject material outwardly through said second opening into a mold when said housing is in contact with a mold, said piston being movable outwardly of said chamber after injection of material into a mold, and means for sliding said housing away from said molds as said piston is moved outwardly of said chamber, and compressed air nozzles spaced from said injection means, said nozzles being directed at one open end of a mold alined therewith to eject the assimilated shrimp product from the last named mold, a control means connected to said die table, said injection means and said nozzles for synchronizing the operation thereof.

6. In a molding apparatus for manufacturing assimilated shrimp from shredded shrimp meat, an intermittently rotatable die table having a plurality of spaced molds therein, said molds being similar in shape to a shrimp and each having an opening for receiving material to be molded, an injection means comprising a housing slidably mounted with respect to said molds, said housing having a chamber open at one end for the reception of material to be introduced into said molds and a second opening at its opposite end for egress of said material, said second opening being alignable with the opening of each of said molds upon sliding movement of said housing toward each of said molds as each of said molds is positioned opposite said second opening, said housing being engageable with each of said molds as their openings are respectively alignable with said second opening, plungers connected to said housing and slidably mounted with respect to said molds and slidable with said housing, and spring members connected to said housing and retained in a position such as to urge said housing toward said molds, and a piston movable toward said chamber adjacent the open end thereof to inject material outwardly through said second opening into a mold when said housing is in contact with a mold, said piston being movable outwardly of said chamber after injection of material into a mold, and means for sliding said housing away from said molds as said piston is moved outwardly of said chamber, compressed air nozzles spaced from said injecting means, said nozzles being directed at one open end of a mold aligned therewith to eject the assimilated shrimp product from the last-named mold, and water nozzle spaced from said air nozzles and directed toward one open end of an alined empty mold for washing the empty mold, a control means connected to said die table, said injecting means said air nozzles and said water nozzles for coordinating the operation thereof.

7. In a molding apparatus for manufacturing assimilated shrimp from shredded shrimp meat, an intermittently rotatable die table having a plurality of spaced molds therein, said molds being similar in shape to a shrimp and each having an opening for receiving material to be molded, an injection means comprising a housing slidably mounted with respect to said molds, said housing having a chamber open at one end for the reception of material to be introduced into said molds and a second opening at its opposite end for egress of said material, said second opening being alignable with the opening of each of said molds upon sliding movement of said housing toward each of said molds as each of said molds is positioned opposite said second opening, said housing being engageable with each of said molds as their openings are respectively alignable with said second opening, plungers connected to said housing and slidably mounted with respect to said molds and slidable with said housing, and spring members connected to said housing and retained in a position such as to urge said housing toward said molds, and a piston movable toward said chamber adjacent the open end thereof to inject material outwardly through said second opening into a mold when said housing is in contact with a mold, said piston being movable outwardly of said chamber after injection of material into a mold, and means for sliding said housing away from said molds as said piston is moved outwardly of said chamber, compressed air nozzles, spaced from said injecting means, said nozzles being directed at one open end of a mold aligned therewith to eject the assimilated shrimp product from the last-named mold, water nozzles spaced from said air nozzles and directed toward one open end of an alined empty mold for washing the empty mold, and means spaced from said washing nozzles for lubricating each mold in preparation for a following injection of shredded shrimp, and means connected to said die table, said injecting means, said air nozzles, said water nozzles and said means for lubricating for controlling and synchronizing the operation thereof.

ADOLF E. WALTMAN.

References Cited in the file of this patent

UNITED STATES PATENTS

| Number | Name | Date |
|---|---|---|
| 470,692 | Merrell | Mar. 15, 1892 |
| 798,361 | Morton | Aug. 29, 1905 |
| 994,714 | Boyle | June 17, 1911 |
| 1,869,005 | Charnock | July 26, 1932 |
| 2,105,211 | Bessonette | Jan. 11, 1938 |
| 2,282,308 | Dahlin | May 12, 1942 |
| 2,333,056 | Thoreson et al. | Oct. 26, 1943 |